(12) United States Patent
Yang et al.

(10) Patent No.: US 10,642,389 B2
(45) Date of Patent: May 5, 2020

(54) TOUCH DISPLAY DRIVING CIRCUIT, TOUCH DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Haisheng Wang, Beijing (CN); Jingbo Xu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/646,282

(22) PCT Filed: Oct. 24, 2014

(86) PCT No.: PCT/CN2014/089387
§ 371 (c)(1),
(2) Date: May 20, 2015

(87) PCT Pub. No.: WO2015/184726
PCT Pub. Date: Dec. 10, 2015

(65) Prior Publication Data
US 2016/0253012 A1 Sep. 1, 2016

(30) Foreign Application Priority Data

Jun. 5, 2014 (CN) .......................... 2014 1 0247650

(51) Int. Cl.
*G06F 3/041* (2006.01)
*G09G 3/3233* (2016.01)
*G06F 3/042* (2006.01)
*G09G 3/3225* (2016.01)

(52) U.S. Cl.
CPC ............ *G06F 3/0412* (2013.01); *G06F 3/041* (2013.01); *G06F 3/042* (2013.01); *G06F 3/0418* (2013.01);
(Continued)

(58) Field of Classification Search
CPC ...... G06F 3/0412; G06F 3/041; G06F 3/0418; G06F 3/042; G09G 3/3233; G09G 3/3225;
(Continued)

(56) References Cited

U.S. PATENT DOCUMENTS 8,519,914 B2 * 8/2013 Kim ..................... G09G 3/3233
345/76
9,318,054 B2 * 4/2016 Lee ....................... G09G 3/3233
(Continued)

FOREIGN PATENT DOCUMENTS

CN 103197796 A 7/2013
CN 203179480 U 9/2013
(Continued)

OTHER PUBLICATIONS

European search report dated Jan. 2, 2017 for corresponding EP application 14861173.4.
(Continued)

*Primary Examiner* — Jeff Piziali
(74) *Attorney, Agent, or Firm* — Nath, Goldberg & Meyer; Joshua B. Goldberg

(57) ABSTRACT

The present invention discloses a touch display driving circuit and a touch display apparatus. The touch display driving circuit comprises a display device, a driving transistor, a light-sensing touch module and a compensation driving module, the light-sensing touch module comprises a phototransistor and a light-sensing control unit, a gate of the phototransistor is connected with a first electrode of the
(Continued)

phototransistor, the light-sensing control unit is connected with the phototransistor and a read line, a control electrode of the driving transistor is connected with the compensation driving module, the compensation driving module is connected with a first power supply terminal, a first terminal of the display device, a first electrode of the driving transistor and a second electrode of the driving transistor, a second terminal of the display device is connected with a second power supply terminal.

12 Claims, 5 Drawing Sheets

(52) U.S. Cl.
CPC ......... *G09G 3/3225* (2013.01); *G09G 3/3233* (2013.01); *G09G 2300/0819* (2013.01); *G09G 2300/0842* (2013.01); *G09G 2300/0861* (2013.01); *G09G 2320/0295* (2013.01); *G09G 2320/045* (2013.01); *G09G 2360/148* (2013.01)

(58) Field of Classification Search
CPC ..... G09G 2360/148; G09G 2320/0295; G09G 2300/0842; G09G 2300/0819; G09G 2300/0861; G09G 2320/045
See application file for complete search history.

(56) References Cited

U.S. PATENT DOCUMENTS

| | | | |
|---|---|---|---|
| 9,354,735 B2* | 5/2016 | Abileah | G06F 3/0412 |
| 2003/0032213 A1* | 2/2003 | Yonezawa | H01L 27/14609 438/48 |
| 2005/0007353 A1* | 1/2005 | Smith | G09G 3/3233 345/204 |
| 2005/0225546 A1* | 10/2005 | Akimoto | G06F 3/042 345/207 |
| 2007/0109239 A1 | 5/2007 | Den Boer et al. | |
| 2009/0027310 A1* | 1/2009 | Kim | G09G 3/3233 345/76 |
| 2010/0013816 A1* | 1/2010 | Kwak | G09G 3/3233 345/211 |
| 2010/0141644 A1* | 6/2010 | Lee | G09G 3/3233 345/214 |
| 2010/0164847 A1* | 7/2010 | Lee | G09G 3/3233 345/77 |
| 2010/0194716 A1* | 8/2010 | Park | G09G 3/3233 345/204 |
| 2011/0001711 A1* | 1/2011 | Choi | G06F 3/0412 345/173 |
| 2011/0109660 A1* | 5/2011 | Kim | G09G 3/3233 345/690 |
| 2012/0092302 A1 | 4/2012 | Imai et al. | |
| 2015/0049050 A1 | 2/2015 | Zhao | |
| 2015/0193045 A1 | 7/2015 | Zhou et al. | |
| 2016/0253012 A1 | 9/2016 | Yang et al. | |

FOREIGN PATENT DOCUMENTS

| | | |
|---|---|---|
| CN | 103383837 A | 11/2013 |
| CN | 103680385 A | 3/2014 |
| CN | 104102382 A | 10/2014 |

OTHER PUBLICATIONS

European First Office Action dated Nov. 8, 2019 for corresponding EP application 14861173.4.

* cited by examiner

TOUCH DISPLAY DRIVING CIRCUIT, TOUCH DISPLAY APPARATUS

CROSS-REFERENCE TO RELATED APPLICATION

This is a National Phase Application filed under 35 U.S.C. 371 as a national stage of PCT/CN2014/089387, filed Oct. 24, 2014, an application claiming the benefit of Chinese Application No. 201410247650.6, filed Jun. 5, 2014, the content of each of which is hereby incorporated by reference in its entirety.

FIELD OF THE INVENTION

The present invention relates to the field of display technology, and in particular, relates to a touch display driving circuit and a touch display apparatus.

BACKGROUND OF THE INVENTION

Active matrix organic light emitting diode (AMOLED) display is one of hot areas of research in the field of flat panel display. Compared with thin film transistor liquid crystal display (TFT-LCD), the organic light emitting diode (OLED) display has advantages of low power consumption, low production cost, self-luminescence, wide view angle, rapid response speed and so on. Currently, in display field of mobile phone, PDA, digital camera and the like, the OLED display has replaced the conditional LCD. At present, in-cell touch technology has been successfully applied to LCD, and the obtained LCD has been successfully produced in mass by first-line producers. However, due to limitation of patent technology and yield, the LCD employing the in-cell touch technology still cannot completely and massively replace the add-on and one glass solution (OGS) products. If the in-cell touch technology and the AMOLED display are integrated together, that is, if the manufacturing process for touch and the manufacturing process for the array substrate of the AMOLED are integrated together, the integration of the two functions representing the latest technologies will have an ingrained status in the future display field.

SUMMARY OF THE INVENTION

The present invention provides a touch display driving circuit and a touch display apparatus, which can achieve light-sensing touch for the touch display apparatus, and can reduce manufacturing processes of the touch display apparatus, save production cost of the touch display apparatus, and improve the aperture ratio of the touch display apparatus.

In order to achieve above object, the present invention provides a touch display driving circuit, comprising a display device, a driving transistor, a light-sensing touch module and a compensation driving module, the light-sensing touch module comprises a phototransistor and a light-sensing control unit, a gate of the phototransistor is connected with a first electrode of the phototransistor, the light-sensing control unit is connected with the phototransistor and a read line, a control electrode of the driving transistor is connected with the compensation driving module, the compensation driving module is connected with a first power supply terminal, a first terminal of the display device, a first electrode of the driving transistor and a second electrode of the driving transistor, a second terminal of the display device is connected with a second power supply terminal, wherein:

the driving transistor is used for driving the display device to display pixels;

the compensation driving module is used for adjusting voltage of the control electrode of the driving transistor to eliminate influence on driving current by threshold voltage of the driving transistor when the driving transistor drives the display device to display pixels;

the phototransistor is used for generating a corresponding electric signal in accordance with received light intensity, and sending the electric signal to the light-sensing control unit;

the light-sensing control unit is used for controlling status of the phototransistor and storing the electric signal, and sending the electric signal via the read line to a signal processing unit connected with the read line during a light-sensing reading phase.

Optionally, the light-sensing control unit comprises a light-sensing resetting unit, a light-sensing writing unit, a light-sensing storing unit and a light-sensing transporting unit, the light-sensing resetting unit is connected with a first control line and the first electrode of the phototransistor, the light-sensing writing unit is connected with a data line, a second control line and the first electrode of the phototransistor, the light-sensing storing unit is connected with the first electrode and a second electrode of the phototransistor, the light-sensing transporting unit is connected with a third control line, the light-sensing storing unit and the read line, wherein:

the light-sensing resetting unit is used for performing a resetting process on the phototransistor in accordance with a first control signal on the first control line during a light-sensing resetting phase;

the light-sensing writing unit is used for transferring data voltage in the data line to the phototransistor in accordance with a second control signal on the second control line during a light-sensing writing phase;

the light-sensing storing unit is used for storing the electric signal generated by the phototransistor during a light-sensing storing phase;

the light-sensing transporting unit is used for sending the electric signal stored in the light-sensing storing unit to the signal processing unit via the read line in accordance with a third control signal on the third control line during a light-sensing transporting phase.

Optionally, the light-sensing resetting unit comprises a first optical transistor, the light-sensing writing unit comprises a second optical transistor, the light-sensing storing unit comprises a first capacitor, the light-sensing transporting unit comprises a third optical transistor, wherein:

a control electrode of the first optical transistor is connected with the first control line, a first electrode of the first optical transistor is connected with a third power supply terminal, a second electrode of the first optical transistor is connected with the first electrode of the phototransistor;

a control electrode of the second optical transistor is connected with the second control line, a first electrode of the second optical transistor is connected with the data line, a second electrode of the second optical transistor is connected with the first electrode of the phototransistor;

a first terminal of the first capacitor is connected with the second electrode of the phototransistor, a second terminal of the first capacitor is connected with the first electrode of the phototransistor;

a control electrode of the third optical transistor is connected with the third control line, a first electrode of the third optical transistor is connected with the first terminal of the first capacitor, a second electrode of the third optical transistor is connected with the read line.

Optionally, all of the first optical transistor, the second optical transistor and the third optical transistor are P-type thin film transistors.

Optionally, the compensation driving module comprises a compensation resetting unit, a compensation writing unit, a compensation control unit and a light emitting control unit, the compensation resetting unit is connected with the first control line and the control electrode of the driving transistor, the compensation writing unit is connected with the second control line, the control electrode of the driving transistor and the second electrode of the driving transistor, the compensation control unit is connected with the data line, the second control line, the third control line, the control electrode of the driving transistor, the second electrode of the driving transistor and the display device, the light emitting control unit is connected with a light emitting control line and the first electrode of the driving transistor, wherein:

the compensation resetting unit is used for resetting voltage of the control electrode of the driving transistor in accordance with the first control signal on the first control line during a compensation resetting phase;

the compensation writing unit is used for charging the control electrode of the driving transistor in accordance with the second control signal on the second control line during a compensation charging phase;

the compensation control unit is used for performing a variable compensation on the voltage of the control electrode of the driving transistor during a variable compensation phase;

the light emitting control unit is used for controlling the display device to display pixels in accordance with a light emitting control signal on the light emitting control line during a displaying phase.

Optionally, the compensation resetting unit comprises a second displaying transistor, the compensation writing unit comprises a fourth displaying transistor, the compensation control unit comprises a third displaying transistor, a second capacitor and a fifth displaying transistor, the light emitting control unit comprises a first displaying transistor, wherein:

a control electrode of the second displaying transistor is connected with the first control line, a first electrode of the second displaying transistor is connected with a fourth power supply terminal, a second electrode of the second displaying transistor is connected with the control electrode of the driving transistor;

a control electrode of the fourth displaying transistor is connected with the second control line, a first electrode of the fourth displaying transistor is connected with the second electrode of the driving transistor, a second electrode of the fourth displaying transistor is connected with the control electrode of the driving transistor;

a control electrode of the third displaying transistor is connected with the second control line, a first electrode of the third displaying transistor is connected with the data line, a second electrode of the third displaying transistor is connected with a first terminal of the second capacitor;

a second terminal of the second capacitor is connected with the control electrode of the driving transistor;

a control electrode of the fifth displaying transistor is connected with the third control line, a first electrode of the fifth displaying transistor is connected with the second electrode of the driving transistor, a second electrode of the fifth displaying transistor is connected with the display device;

a control electrode of the first displaying transistor is connected with the light emitting control line, a first electrode of the first displaying transistor is connected with the first power supply terminal, a second electrode of the first displaying transistor is connected with the first electrode of the driving transistor.

Optionally, all of the first displaying transistor, the second displaying transistor, the third displaying transistor, the fourth displaying transistor and the fifth displaying transistor are P-type thin film transistors.

Optionally, the driving transistor is a P-type thin film transistor.

In order to achieve above object, the present invention also provides a touch display apparatus comprising a plurality of pixel regions, wherein at least one pixel region is provided with above touch display driving circuit therein.

Optionally, when more than one pixel regions are individually provided with the touch display driving circuit, the pixel regions individually provided with the touch display driving circuit are uniformly distributed.

The present invention has following advantages: the technical solutions of the present invention effectively integrate AMOLED display and light-sensing in-cell touch function so that light-sensing touch function of an AMOLED display device is achieved, and the technical solutions of the present invention also can reduce manufacturing processes of the touch display apparatus, save production cost and improve the aperture ratio of the touch display apparatus.

DETAILED DESCRIPTION OF THE EMBODIMENTS

To make those skilled in the art better understand the technical solutions of the present invention, the driving circuit and the apparatus for touch and display in the present invention will be further described below in detail in combination with the accompanying drawings.

Figure 1:
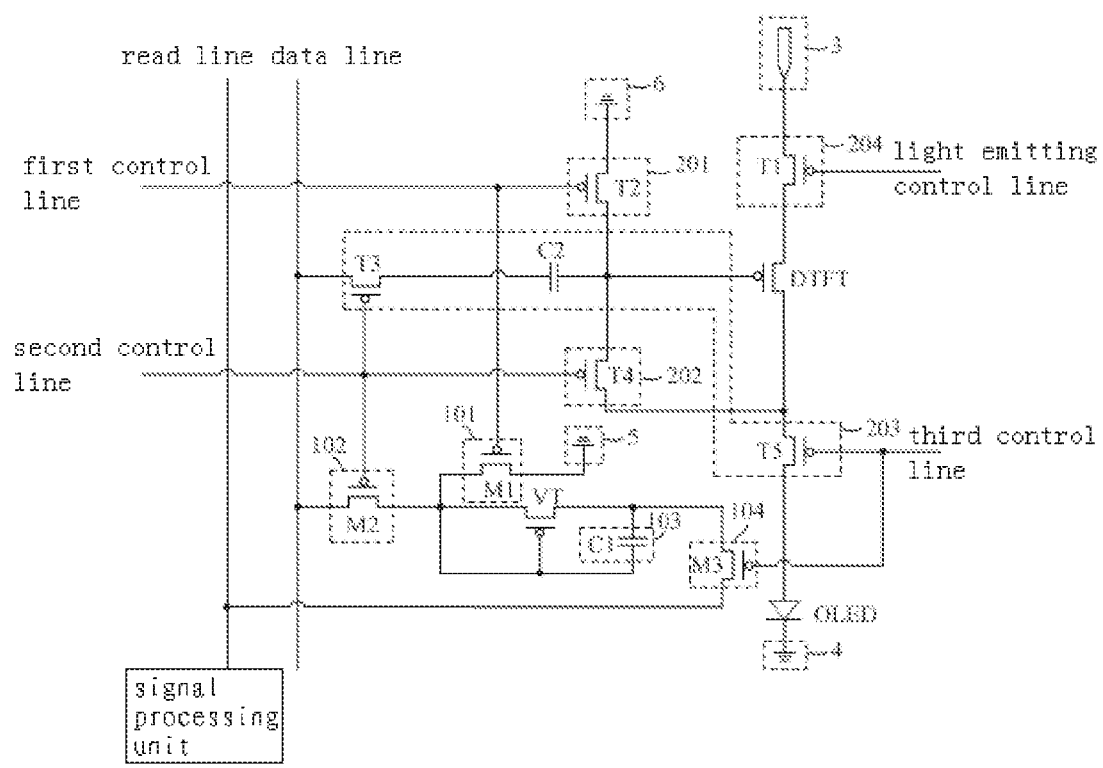
FIG. 1 is a structural diagram of a touch display driving circuit in an embodiment of the present invention.

FIG. 1 is a structural diagram of a touch display driving circuit in an embodiment of the present invention. As shown in FIG. 1, the touch display driving circuit comprises a display device OLED, a driving transistor DTFT, a light-sensing touch module and a compensation driving module, the light-sensing touch module comprises a phototransistor VT and a light-sensing control unit, a gate of the phototransistor VT is connected with a first electrode of the phototransistor VT, the light-sensing control unit is connected with the phototransistor VT and a read line, a control electrode of the driving transistor DTFT is connected with the compensation driving module, the compensation driving module is connected with a first power supply terminal 3, a first terminal of the display device OLED, a first electrode of the driving transistor DTFT and a second electrode of the driving transistor DTFT, a second terminal of the display device OLED is connected with a second power supply terminal 4. The driving transistor DTFT is used for driving the display device OLED to display pixels. The compensation driving module is used for adjusting voltage of the control electrode of the driving transistor DTFT to eliminate influence on driving current by threshold voltage of the driving transistor DTFT when the driving transistor DTFT drives the display device OLED to display pixels. The phototransistor VT is used for generating a corresponding electric signal in accordance with received light intensity, and sending the electric signal to the light-sensing control unit. The light-sensing control unit is used for controlling status of the phototransistor VT and storing the electric signal, and sending the electric signal via the read line to a signal processing unit connected with the read line during a light-sensing reading phase.

It should be noted that, the driving transistor DTFT in the present embodiment is a P-type thin film transistor.

The touch display driving circuit of the present embodiment integrates light-sensing touch technology and AMOLED technology so that touch function of an AMOLED display panel is achieved. Meanwhile, not only light-sensing touch has the same touch sensitivity and function as that of capacitive touch, but also there is another significant advantage that light-sensing touch is not limited by screen size so that it has a place in large size touch. In addition, the touch display apparatus comprising the touch display driving circuit of the present embodiment may be not only touched directly by a finger, but also remotely touched by a laser pointer.

Continuing referring to FIG. 1, the light-sensing control unit comprises a light-sensing resetting unit 101, a light-sensing writing unit 102, a light-sensing storing unit 103 and a light-sensing transporting unit 104, the light-sensing resetting unit 101 is connected with a first control line and the first electrode of the phototransistor VT, the light-sensing writing unit 102 is connected with a data line, a second control line and the first electrode of the phototransistor VT, the light-sensing storing unit 103 is connected with the first electrode and a second electrode of the phototransistor VT, the light-sensing transporting unit 104 is connected with a third control line, the light-sensing storing unit 103 and the read line. The light-sensing resetting unit 101 is used for performing a resetting process on the phototransistor VT in accordance with a first control signal on the first control line during a light-sensing resetting phase. The light-sensing writing unit 102 is used for transferring data voltage in the data line to the phototransistor VT in accordance with a second control signal on the second control line during a light-sensing writing phase. The light-sensing storing unit 103 is used for storing the electric signal generated by the phototransistor VT during a light-sensing storing phase. The light-sensing transporting unit 104 is used for sending the electric signal stored in the light-sensing storing unit 103 to the signal processing unit via the read line in accordance with a third control signal on the third control line during a light-sensing transporting phase.

More specifically, the light-sensing resetting unit 101 comprises a first optical transistor M1, the light-sensing writing unit 102 comprises a second optical transistor M2, the light-sensing storing unit 103 comprises a first capacitor C1, the light-sensing transporting unit 104 comprises a third optical transistor M3. A control electrode of the first optical transistor M1 is connected with the first control line, a first electrode of the first optical transistor M1 is connected with a third power supply terminal 5, a second electrode of the first optical transistor M1 is connected with the first electrode of the phototransistor VT. A control electrode of the second optical transistor M2 is connected with the second control line, a first electrode of the second optical transistor M2 is connected with the data line, a second electrode of the second optical transistor M2 is connected with the first electrode of the phototransistor VT. A first terminal of the first capacitor C1 is connected with the second electrode of the phototransistor VT, a second terminal of the first capacitor C1 is connected with the first electrode of the phototransistor VT. A control electrode of the third optical transistor M3 is connected with the third control line, a first electrode of the third optical transistor M3 is connected with the first terminal of the first capacitor, a second electrode of the third optical transistor M3 is connected with the read line.

Continuing referring to FIG. 1, the compensation driving module comprises a compensation resetting unit 201, a compensation writing unit 202, a compensation control unit 203 and a light emitting control unit 204, the compensation resetting unit 201 is connected with the first control line and the control electrode of the driving transistor DTFT, the compensation writing unit 202 is connected with the second control line, the control electrode of the driving transistor DTFT and the second electrode of the driving transistor DTFT, the compensation control unit 203 is connected with the data line, the second control line, the third control line, the control electrode of the driving transistor DTFT, the second electrode of the driving transistor DTFT and the display device OLED, the light emitting control unit 204 is connected with a light emitting control line and the first electrode of the driving transistor DTFT. The compensation resetting unit 201 is used for resetting voltage of the control electrode of the driving transistor DTFT in accordance with the first control signal on the first control line during a compensation resetting phase. The compensation writing unit 202 is used for charging the control electrode of the driving transistor DTFT in accordance with the second control signal on the second control line during a compensation charging phase. The compensation control unit 203 is used for performing a variable compensation on the voltage of the control electrode of the driving transistor DTFT during a variable compensation phase. The light emitting control unit 204 is used for controlling the display device OLED to display pixels in accordance with a light emitting control signal on the light emitting control line during a displaying phase.

More specifically, the compensation resetting unit 201 comprises a second displaying transistor T2, the compensation writing unit 202 comprises a fourth displaying transistor T4, the compensation control unit 203 comprises a third displaying transistor T3, a second capacitor C2 and a fifth displaying transistor T5, the light emitting control unit 204 comprises a first displaying transistor T1. A control electrode of the second displaying transistor T2 is connected with the first control line, a first electrode of the second displaying transistor T2 is connected with a fourth power supply terminal 6, a second electrode of the second displaying transistor T2 is connected with the control electrode of the driving transistor DTFT. A control electrode of the fourth displaying transistor T4 is connected with the second control line, a first electrode of the fourth displaying transistor T4 is connected with the second electrode of the driving transistor DTFT, a second electrode of the fourth displaying transistor T4 is connected with the control electrode of the driving transistor DTFT. A control electrode of the third displaying transistor T3 is connected with the second control line, a first electrode of the third displaying transistor T3 is connected with the data line, a second electrode of the third displaying transistor T3 is connected with a first terminal of the second capacitor. A second terminal of the second capacitor C2 is connected with the control electrode of the driving transistor DTFT. A control electrode of the fifth displaying transistor T5 is connected with the third control line, a first electrode of the fifth displaying transistor T5 is connected with the second electrode of the driving transistor DTFT, a second electrode of the fifth displaying transistor T5 is connected with the display device OLED. A control electrode of the first displaying transistor T1 is connected with the light emitting control line, a first electrode of the first displaying transistor T1 is connected with the first power supply terminal 3, a second electrode of the first displaying transistor T1 is connected with the first electrode of the driving transistor DTFT.

It should be noted that, all of the first optical transistor M1, the second optical transistor M2, the third optical transistor M3, the first displaying transistor T1, the second displaying transistor T2, the third displaying transistor T3, the fourth displaying transistor T4 and the fifth displaying transistor T5 in the present embodiment of the invention function as on-off control switches. Further, the transistors functioning as switches may be thin film transistors (TFTs), or may be metal oxide semiconductor (MOS) field effect transistors, which will not be limited here. In the present embodiment, a first electrode of a transistor refers to the source of the transistor, and correspondingly a second electrode of a transistor refers to the drain of the transistor. In specific descriptions of embodiments, as an example, all the transistors functioning as switches are illustrated as thin film transistors.

Optionally, all of the first optical transistor M1, the second optical transistor M2 and the third optical transistor M3 are P-type thin film transistors. All of the first displaying transistor T1, the second displaying transistor T2, the third displaying transistor T3, the fourth displaying transistor T4 and the fifth displaying transistor T5 are P-type thin film transistors.

In the present embodiment, all the transistors are P-type thin film transistors, and all the P-type thin film transistors may be formed simultaneously by the same process, thus the manufacturing process is simplified and the cost is saved. For a person skilled in the art, it should be understood that, in actual applications, types of the transistors may be not completely the same with each other, as long as the on/off statuses of the thin film transistors whose control electrodes are connected with the same signal line are the same with each other, the technical solutions of the present invention can be implemented. The preferable implementations of the present invention should not be understood as limitation to the protection scope of the present invention.

Operation procedure of the touch display driving circuit of the present embodiment will be described in detail below in conjunction with the accompanying drawings.

Figure 2:
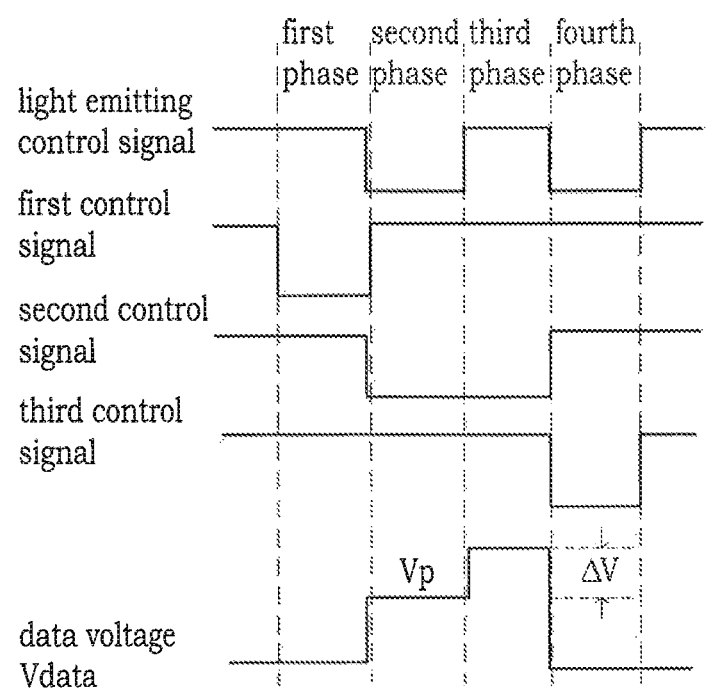
FIG. 2 is a timing diagram of signals in the touch display driving circuit shown in FIG. 1.

FIG. 2 is a timing diagram of signals in the touch display driving circuit shown in FIG. 1. As shown in FIG. 2, in the first phase, the light-sensing touch module is in the light-sensing resetting phase, and the compensation driving module is in the compensation resetting phase; in the second phase, the light-sensing touch module is in the light-sensing writing phase, and the compensation driving module is in the compensation charging phase; in the third phase, the light-sensing touch module is in the light-sensing storing phase, and the compensation driving module is in the variable compensation phase; in the fourth phase, the light-sensing touch module is in the light-sensing transporting phase, and the compensation driving module is in the display phase. The first power supply terminal 3 inputs a Vdd signal of high level, the second power supply terminal 4, the third power supply terminal 5 and the fourth power supply terminal 6 input Vss signals of low level or are connected with ground, the data line inputs a data voltage Vdata.

Figure 3:
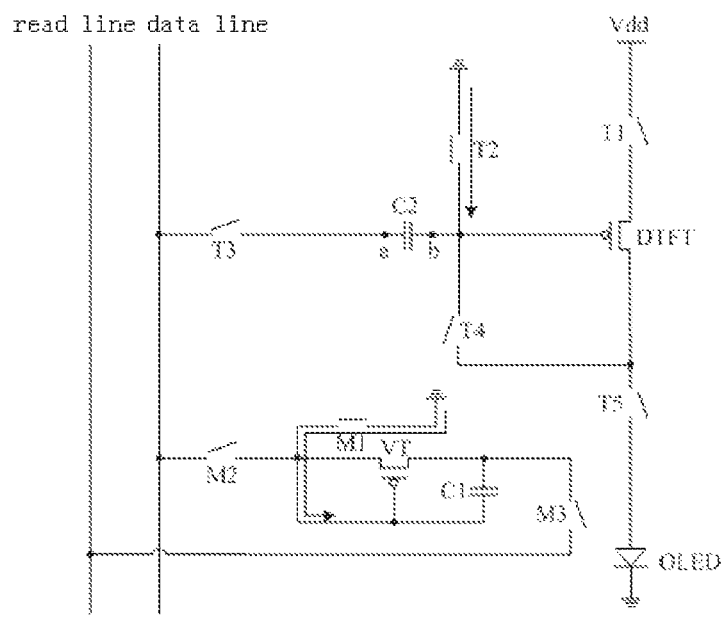
FIG. 3 is an equivalent circuit diagram of the touch display driving circuit shown in FIG. 1 being in a first phase.

FIG. 3 is an equivalent circuit diagram of the touch display driving circuit shown in FIG. 1 being in the first phase. As shown in FIG. 2, in the first phase, the light emitting control line inputs a light emitting control signal of high level, the first control line inputs a first control signal of low level, the second control line inputs a second control signal of high level, the third control line inputs a third control signal of high level, data line inputs a data voltage Vdata of reference potential.

When the light-sensing touch module is in the light-sensing resetting phase, in the light-sensing touch module, the first optical transistor M1 is turned on, and both the second optical transistor M2 and the third optical transistor M3 are turned off. At this time, the first electrode of the phototransistor VT and the second terminal of the first capacitor C1 are connected with ground, the voltage of the first electrode of the phototransistor VT is 0V, and the voltage across two terminals of the first capacitor C1 is 0V.

When the compensation driving module is in the compensation resetting phase, in the compensation driving module, the second displaying transistor T2 is turned on, all of the first displaying transistor T1, the second displaying transistor T3, the fourth displaying transistor T4 and the fifth displaying transistor T5 are turned off. At this time, the voltages of all of the control electrode of the driving transistor DTFT, the first terminal a of the second capacitor C2 and the second terminal b of the second capacitor C2 are 0V.

Figure 4:
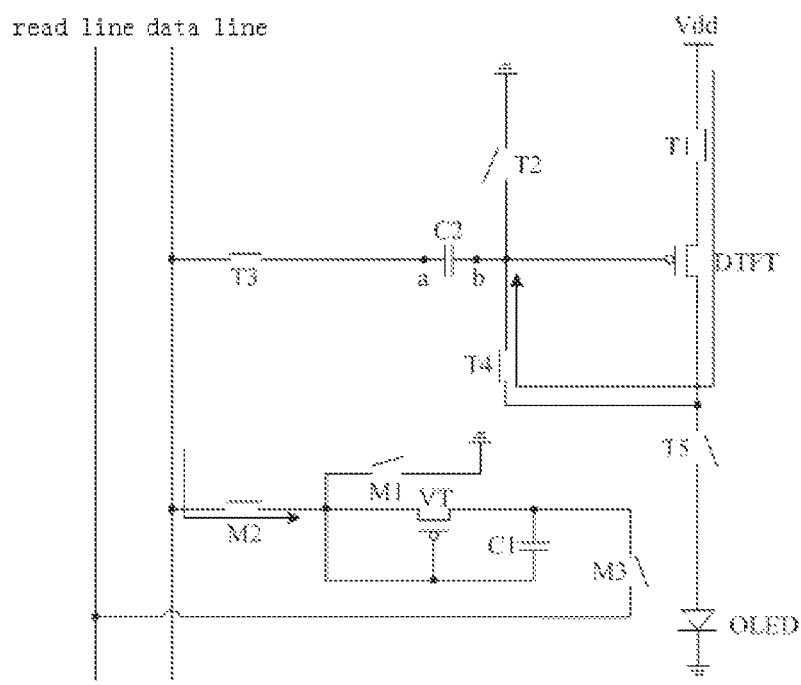
FIG. 4 is an equivalent circuit diagram of the touch display driving circuit shown in FIG. 1 being in a second phase.

FIG. 4 is an equivalent circuit diagram of the touch display driving circuit shown in FIG. 1 being in the second phase. As shown in FIG. 2, in the second phase, the light emitting control line inputs a light emitting control signal of low level, the first control line inputs a first control signal of high level, the second control line inputs a second control signal of low level, the third control line inputs a third control signal of high level, and the data line inputs a data voltage Vdata of Vp.

When the light-sensing touch module is in the light-sensing writing phase, in the light-sensing touch module, the second optical transistor M2 is turned on, and both the first optical transistor M1 and the third optical transistor M3 are turned off. At this time, both the first electrode of the phototransistor VT and the second terminal of the first capacitor C1 are connected with the data line. Therefore, the voltages of the first electrode of the phototransistor VT and the second terminal of the first capacitor C1 equal to Vp.

When the compensation driving module is in the compensation charging phase, in the compensation driving module, all of the first displaying transistor T1, the third displaying transistor T3 and the fourth displaying transistor T4 are turned on, and the second displaying transistor T2 and the fifth displaying transistor T5 are turned off. At this time, the first terminal a of the second capacitor C2 is connected with the data line, thus the voltage of the first terminal a of the second capacitor C2 equals to Vp. In the early stage of the compensation charging phase, the driving transistor DTFT is in the on status, the second capacitor C2 is charged by the Vdd signal of high level via the first displaying transistor T1, the driving transistor DTFT and the fourth displaying transistor T4, until the voltage of the second terminal b of the second capacitor C2 becomes Vdd-Vth, the driving transistor DTFT is turned off, and the charging is stopped. At this time, the voltage of the control electrode of the driving transistor DTFT is Vdd-Vth, wherein, Vth is the threshold voltage of the driving transistor DTFT. Meanwhile, the voltage difference between the two terminals of the second capacitor C2 is Vdd-Vth-Vp.

Figure 5:
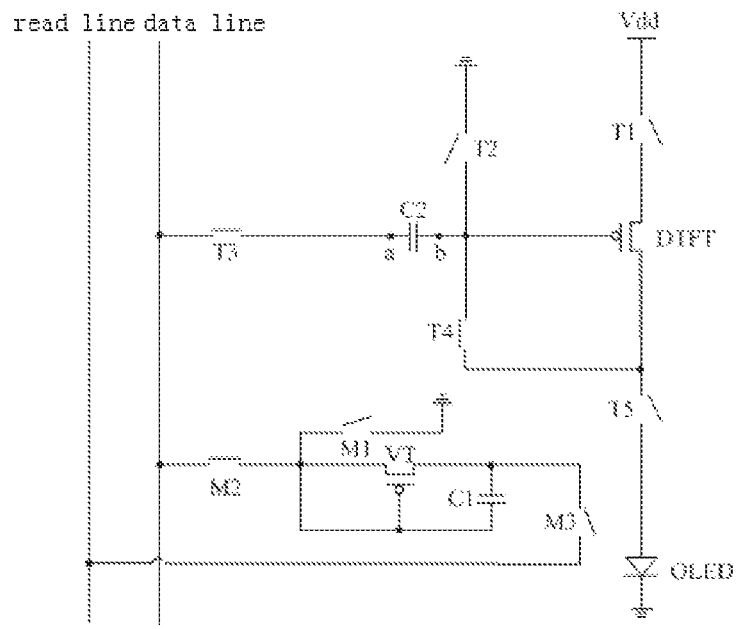
FIG. 5 is an equivalent circuit diagram of the touch display driving circuit shown in FIG. 1 being in a third phase.

FIG. 5 is an equivalent circuit diagram of the touch display driving circuit shown in FIG. 1 being in the third phase. As shown in FIG. 2, in the third phase, the light emitting control line inputs a light emitting control signal of high level, the first control line inputs a first control signal of high level, the second control line inputs a second control signal of low level, the third control line inputs a third control signal of high level, and a variable ΔV is generated in the potential of the data voltage Vdata inputted by the data line. At this time, the potential of the data voltage Vdata inputted by the data line is Vp+ΔV, wherein ΔV is a positive value.

When the light-sensing touch module is in the light-sensing storing phase, in the light-sensing touch module, the second optical transistor M2 is turned on, and both the first optical transistor M1 and the third optical transistor M3 are turned off. At this time, the first electrode of the phototransistor VT is connected with the data line, the voltage of the first electrode of the phototransistor VT equals to Vp+ΔV, and the phototransistor VT generates a corresponding electric signal in accordance with the received light intensity, the electric signal is stored by the first capacitor C1, wherein, the larger the light intensity is, the larger the current value of the generated electric signal is.

Taking performing touch by a human finger as example, when the human finger touches the region provided with the phototransistor VT, the light intensity at the phototransistor VT is small, thus the current value of the electric signal generated at this time is small; when the human finger leaves the corresponding region, the light intensity at the phototransistor VT is large, thus the current value of the electric signal generated at this time is large.

Taking performing touch remotely by a laser pointer as example, when the laser beam of the laser pointer irradiates onto the region provided with the phototransistor VT, the light intensity at the phototransistor VT is large, thus the current value of the electric signal generated at this time is large; when the laser beam of the laser pointer leaves the corresponding region, the light intensity at the phototransistor VT is small, thus the current value of the electric signal generated at this time is small.

When the compensation driving module is in the variable compensation phase, in the compensation driving module, the third displaying transistor T3 and the fourth displaying transistor T4 are turned on, all of the first displaying transistor T1, the second displaying transistor T2 and the fifth displaying transistor T5 are turned off. The voltage of the first terminal of the second capacitor C2 becomes Vp+ΔV. In order to maintain the voltage difference between the two terminals of the second capacitor C2 as Vdd-Vth-Vp, at this time, the voltage of the second terminal of the second capacitor C2 transits to Vdd−Vth+ΔV, the voltage of the control electrode of the corresponding driving transistor DTFT becomes Vdd-Vth+ΔV.

Figure 6:
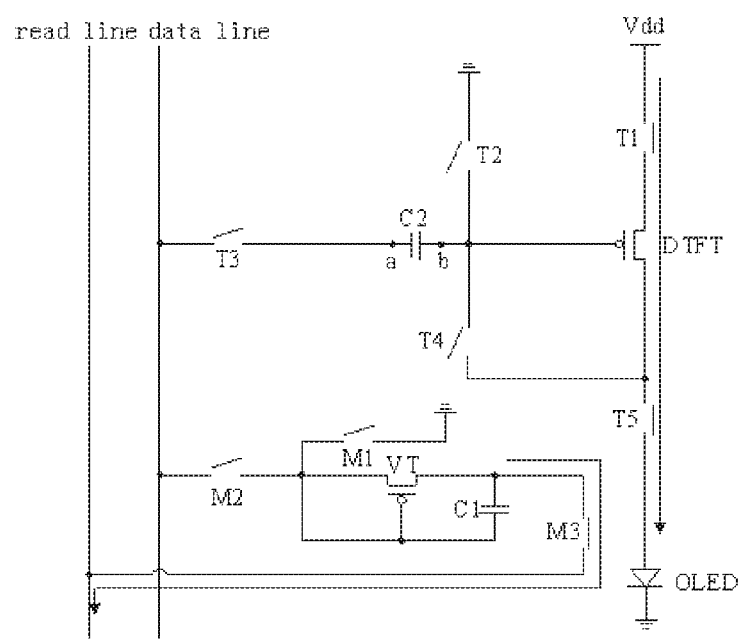
FIG. 6 is an equivalent circuit diagram of the touch display driving circuit shown in FIG. 1 being in a fourth phase.

FIG. 6 is an equivalent circuit diagram of the touch display driving circuit shown in FIG. 1 being in the fourth phase. As shown in FIG. 2, in the fourth phase, the light emitting control line inputs a light emitting control signal of low level, the first control line inputs a first control signal of high level, the second control line inputs a second control signal of high level, the third control line inputs a third control signal of low level, and the data voltage Vdata inputted by the data line becomes the reference voltage.

When the light-sensing touch module is in the light-sensing transporting phase, in the light-sensing touch module, the third optical transistor M3 is turned on, and both the first optical transistor M1 and the second optical transistor M2 re turned off. At this time, the first capacitor C1 is connected with the read line, and the stored electric signal is sent to the signal processing unit (not shown in figures) via the read line. The signal processing unit performs process on the electric signal to judge whether there is a touch action on the corresponding pixel region, wherein, the horizontal ordinate of the touch point position may be determined via scanning by the third control line, and the longitudinal coordinate of the touch point position may be determined via scanning by the read line.

In order to make the touch display apparatus comprising the touch display driving circuit of the present embodiment can be touched directly by the human finger or remotely by the laser pointer, the procedure that the signal processing unit in the present embodiment judges whether there is a touch action at a corresponding coordinate point is roughly as follows: the signal processing unit continuously acquires electric signals two times, and correspondingly processes the two electric signals to obtain two current values corresponding to the two electric signals, then calculates the difference between the two current values to obtain a current difference value, finally judges whether there is a touch action at the coordinate point in accordance with the current difference value. Specifically, if the obtained current difference value is within a predetermined range, it is judged that there is a touch action at the coordinate point; if the obtained current difference value is not within the predetermined range, it is judged that there is no touch action at the coordinate point. The principle of the judging procedure is that: no matter the touch is performed by the human finger or remotely by the laser pointer, it must make the phototransistor VT receives light with a large light intensity one time and receives light with a small light intensity one time during a short time period, and a large current value and a small current value are correspondingly generated, thus whether there is a touch action at a corresponding coordinate point may be judged by continuously acquiring two electric signals, processing the two electric signals to obtain the corresponding current difference value, and then judging whether the current difference value is within the predetermined range, wherein the predetermined range may be set correspondingly by using obtained experimental results.

When the compensation driving module is in the displaying phase, in the compensation driving module, the first displaying transistor T1 and the fifth displaying transistor T5 are turned on, and all of the second displaying transistor T2, the third displaying transistor T3 and the fourth displaying transistor T4 are turned off. At this time, the display device OLED displays pixels, the voltage of the control electrode of the driving transistor DTFT is maintained as Vdd−Vth+ΔV. The saturation driving current of the driving transistor DTFT is:

$$I=K^*(Vgs-Vth)^2=K^*[Vdd-(Vdd-Vth+\Delta V)]^2=K^*(\Delta V)^2$$

Wherein, Vgs is a gate-source voltage of the driving transistor DTFT. It can be seen from the above equation that, the driving current I of the driving transistor DTFT is only relevant to the variable ΔV of the data voltage Vdata inputted by the data line in the third phase, but is irrelevant to the threshold voltage of the driving transistor DTFT. In the present embodiment, when the driving transistor DTFT drives the display device OLED to display pixels, the driving current of the driving transistor DTFT is irrelevant to the threshold voltage of the driving transistor DTFT, which can avoid that the driving current flowing through the display device OLED is affected by the non-uniformity and shift of the threshold voltage of the driving transistor DTFT, so that the uniformity of the driving current flowing through the display device OLED is effectively improved. Meanwhile, due to the presence of the light emitting control unit 204, no current flows through the display device OLED in other phases other than the display phase, so that the usage life of the display device OLED is improved.

It should be noted that, in the technical solutions of the present invention, the first control signal inputted by the first control line is multiplexed by the first optical transistor M1 in the light-sensing touch module and the second displaying transistor T2 in the compensation driving module, the second control signal inputted by the second control line is multiplexed by the second optical transistor M2 in the light-sensing touch module and the third displaying transistor T3 and the fourth displaying transistor T4 in the compensation driving module, the third control signal inputted by the third control line is multiplexed by the third optical transistor M3 in the light-sensing touch module and the fifth displaying transistor T5 in the compensation driving module. With above technical solutions, AMOLED display and light-sensing in-cell touch function are effectively integrated together. Meanwhile, above integrated technical solutions simplify the wiring structure, reduce the wiring space, improve the aperture ratio of the touch display apparatus, and reduce the manufacturing processes in the production procedure of the touch display apparatus.

Meanwhile, since the present embodiment employs AMOLED display technology of low temperature polysilicon (LTPS), such design using a plurality of thin film transistors and capacitors will not affect the aperture ratio of module of the display apparatus.

The touch display driving circuit of the present embodiment effectively integrates AMOLED display and light-sensing in-cell touch function so that light-sensing touch function of the AMOLED display apparatus is achieved, and the technical solutions of the present embodiment also can reduce the manufacturing processes in the production procedure of the touch display apparatus, save the cost and improve the aperture ratio of the touch display apparatus.

The present embodiment of the present invention also provides a touch display apparatus comprising a plurality of pixel regions, wherein at least one pixel region is provided with above touch display driving circuit therein. The structure and operation mode of the touch display driving circuit may be referred to above descriptions of the embodiments, which will not be described repeatedly here.

Figure 7:
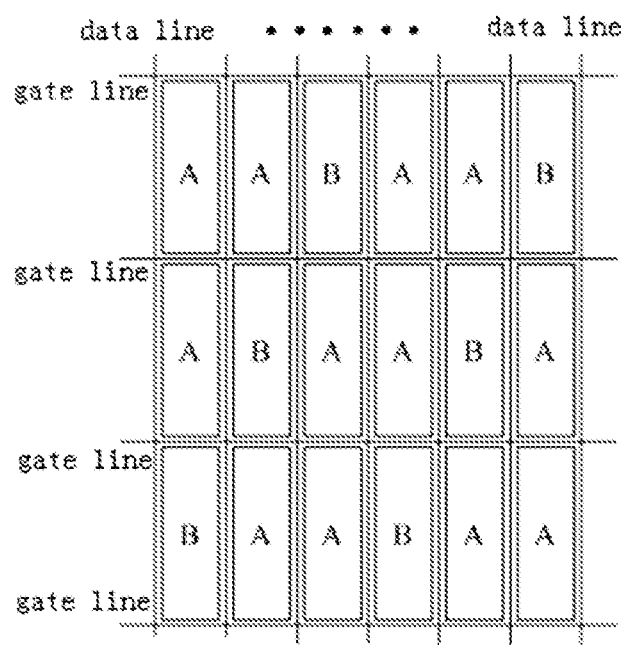
FIG. 7 is a diagram illustrating more than one pixel regions provided with the touch display driving circuit of the present invention.

FIG. 7 is a diagram illustrating more than one pixel regions provided with the touch display driving circuit of the present invention. As shown in FIG. 7, a plurality of gate lines and a plurality of data lines intersect to define a plurality of pixel regions. As a preferable scheme of the present embodiment, when more than one pixel regions are provided with the touch display driving circuit of the present invention, the pixel regions provided with the touch display driving circuit are uniformly distributed. In FIG. 7, the pixel regions are arranged in a 3×6 mode. In one row of pixel regions, one touch display driving circuit of the present invention is provided every two pixel regions, that is, there are the light-sensing touch module and the compensation driving module of above embodiments in each of the pixel regions B, and there is only the compensation driving module rather than the light-sensing touch module of above embodiments in each of other pixel regions A.

It should be noted that, the distribution of the touch display driving circuits in the pixel regions of the touch display apparatus of the present invention may be varied correspondingly in accordance with actual requirements, and above distribution in the present embodiment will not limit the technical solutions of the present invention.

The touch display apparatus of the present embodiment employs the touch display driving circuit of the present invention, and the touch display driving circuit effectively integrate AMOLED display and light-sensing in-cell touch function so that light-sensing touch function of an AMOLED display device is achieved, and the technical solutions of the present invention also can reduce manufacturing processes of the touch display apparatus, save cost and improve the aperture ratio of the touch display apparatus.

It can be understood that, the foregoing implementations are merely exemplary implementations used for illustrating the principle of the present invention, rather than limiting the present invention. Those of ordinary skill in the art may make various variations and improvements without departing from the spirit and essence of the present invention, and these variations and improvements should be encompassed in the protection scope of the present invention.

The invention claimed is:

1. A touch display driving circuit, comprising a display device, a driving transistor, a light-sensing touch module and a compensation driving module, the light-sensing touch module comprises a phototransistor and a light-sensing control unit, a gate of the phototransistor is connected with a first electrode of the phototransistor, the light-sensing control unit is connected with the phototransistor and a read line, a control electrode of the driving transistor is connected with the compensation driving module, the compensation driving module is connected with a first power supply terminal, a first terminal of the display device, a first electrode of the driving transistor and a second electrode of the driving transistor, a second terminal of the display device is connected with a second power supply terminal, the first electrode of the driving transistor and the second electrode of the driving transistor are different from the control electrode of the driving transistor, wherein:

the driving transistor is configured to drive the display device to emit light;

the compensation driving module is configured to adjust a control voltage of the control electrode of the driving transistor to eliminate an influence on a driving current by a threshold voltage of the driving transistor when the driving transistor drives the display device to emit the light;

the phototransistor is configured to generate a corresponding electric signal in accordance with a received light intensity, and sending the electric signal to the light-sensing control unit;

the light-sensing control unit is configured to control a status of the phototransistor and storing the electric signal, and sending the electric signal via the read line to a signal process or connected with the read line during a light-sensing reading phase; and the signal process or processes the electric signal to determine a position where a touch has taken place, wherein the light-sensing control unit comprises a light-sensing resetting unit, a light-sensing writing unit, a light-sensing storing unit and a light-sensing transporting unit, the light-sensing resetting unit is connected with a first control line and the first electrode of the phototransistor, the light-sensing writing unit is connected with a data line, a second control line and the first electrode of the phototransistor, the light-sensing storing unit is connected with the first electrode of the phototransistor and a second electrode of the phototransistor, the light-sensing transporting unit is connected with a third control line, the light-sensing storing unit and the read line, the light-sensing resetting unit is configured to perform a resetting process on the phototransistor in accordance with a first control signal on the first control line during a light-sensing resetting phase, the light-sensing writing unit is configured to transfer a data voltage in the data line to the phototransistor in accordance with a second control signal on the second control line during a light-sensing writing phase, the light-sensing storing unit is configured to store the electric signal generated by the phototransistor during a light-sensing storing phase, the light-sensing transporting unit is configured to send the electric signal stored in the light-sensing storing unit to the signal processor via the read line in accordance with a third control signal on the third control line during a light-sensing transporting phase, and wherein the compensation driving module comprises a compensation resetting unit, a compensation writing unit, a compensation control unit and a light emitting control unit the compensation resetting unit is connected with the first control line and the control electrode of the driving transistor, the compensation writing unit is connected with the second control line, the control electrode of the driving transistor and the second electrode of the driving transistor, the compensation control unit is connected with the data line, the second control line, the third control line, the control electrode of the driving transistor, the second electrode of the driving transistor and the display device, the light emitting control unit is connected with a light emitting control line and the first electrode of the driving transistor, the compensation resetting unit is configured to reset the control voltage of the control electrode of the driving transistor in accordance with the first control signal on the first control line during a compensation resetting phase, the compensation writing unit is configured to charge the control electrode of the driving transistor in accordance with the second control signal on the second control line during a compensation charging phase, the compensation control unit is configured to perform a variable compensation on the control voltage of the control electrode of the driving transistor during a variable compensation phase, the light emitting control unit is configured to control the display device to emit the light in accordance with a light emitting control signal on the light emitting control line during a displaying phase.

2. The touch display driving circuit of claim 1, wherein the light-sensing resetting unit comprises a first optical transistor, the light-sensing writing unit comprises a second optical transistor, the light-sensing storing unit comprises a first capacitor, the light-sensing transporting unit comprises a third optical transistor, wherein:

a control electrode of the first optical transistor is connected with the first control line, a first electrode of the first optical transistor is connected with a third power supply terminal, a second electrode of the first optical transistor is connected with the first electrode of the phototransistor, the first electrode of the first optical transistor and the second electrode of the first optical transistor are different from the control electrode of the first optical transistor;

a control electrode of the second optical transistor is connected with the second control line, a first electrode of the second optical transistor is connected with the data line, a second electrode of the second optical transistor is connected with the first electrode of the phototransistor, the first electrode of the second optical transistor and the second electrode of the second optical transistor are different from the control electrode of the second optical transistor;

a first terminal of the first capacitor is connected with the second electrode of the phototransistor, a second terminal of the first capacitor is connected with the first electrode of the phototransistor;

a control electrode of the third optical transistor is connected with the third control line, a first electrode of the third optical transistor is connected with the first terminal of the first capacitor, a second electrode of the third optical transistor is connected with the read line, the first electrode of the third optical transistor and the second electrode of the third optical transistor are different from the control electrode of the third optical transistor.

3. The touch display driving circuit of claim 2, wherein all of the first optical transistor, the second optical transistor and the third optical transistor are P type thin film transistors.

4. The touch display driving circuit of claim 1, wherein the compensation resetting unit comprises a second displaying transistor, the compensation writing unit comprises a fourth displaying transistor, the compensation control unit comprises a third displaying transistor, a second capacitor and a fifth displaying transistor, the light emitting control unit comprises a first displaying transistor, wherein:

a control electrode of the second displaying transistor is connected with the first control line, a first electrode of the second displaying transistor is connected with a fourth power supply terminal, a second electrode of the second displaying transistor is connected with the control electrode of the driving transistor, the first electrode of the second displaying transistor and the second electrode of the second displaying transistor are different from the control electrode of the second displaying transistor;

a control electrode of the fourth displaying transistor is connected with the second control line, a first electrode of the fourth displaying transistor is connected with the second electrode of the driving transistor, a second electrode of the fourth displaying transistor is connected with the control electrode of the driving transistor, the first electrode of the fourth displaying transistor and the second electrode of the fourth displaying transistor are different from the control electrode of the fourth displaying transistor;

a control electrode of the third displaying transistor is connected with the second control line, a first electrode of the third displaying transistor is connected with the data line, a second electrode of the third displaying transistor is connected with a first terminal of the second capacitor, the first electrode of the third displaying transistor and the second electrode of the third displaying transistor are different from the control electrode of the third displaying transistor;

a second terminal of the second capacitor is connected with the control electrode of the driving transistor;

a control electrode of the fifth displaying transistor is connected with the third control line, a first electrode of the fifth displaying transistor is connected with the second electrode of the driving transistor, a second electrode of the fifth displaying transistor is connected with the display device, the first electrode of the fifth displaying transistor and the second electrode of the fifth displaying transistor are different from the control electrode of the fifth displaying transistor;

a control electrode of the first displaying transistor is connected with the light emitting control line, a first electrode of the first displaying transistor is connected with the first power supply terminal, a second electrode of the first displaying transistor is connected with the first electrode of the driving transistor, the first electrode of the first displaying transistor and the second electrode of the first displaying transistor are different from the control electrode of the first displaying transistor.

5. The touch display driving circuit of claim 4, wherein all of the first displaying transistor, the second displaying transistor, the third displaying transistor, the fourth displaying transistor and the fifth displaying transistor are P type thin film transistors.

6. The touch display driving circuit of claim 1, wherein the driving transistor is a P type thin film transistor.

7. The touch display driving circuit of claim 2, wherein the driving transistor is a P type thin film transistor.

8. The touch display driving circuit of claim 3, wherein the driving transistor is a P type thin film transistor.

9. The touch display driving circuit of claim 4, wherein the driving transistor is a P type thin film transistor.

10. The touch display driving circuit of claim 5, wherein the driving transistor is a P type thin film transistor.

11. A touch display apparatus, comprising a plurality of pixel regions, wherein at least one of the pixel regions is provided with the touch display driving circuit of claim 1.

12. The touch display apparatus of claim 11, wherein more than one of the pixel regions are individually provided with the touch display driving circuit, the pixel regions individually provided with the touch display driving circuit are uniformly distributed.

* * * * *